May 8, 1962 R. E. RASMUSSEN 3,033,261
HYDROPNEUMATIC TIRE
Filed June 8, 1960 2 Sheets-Sheet 1
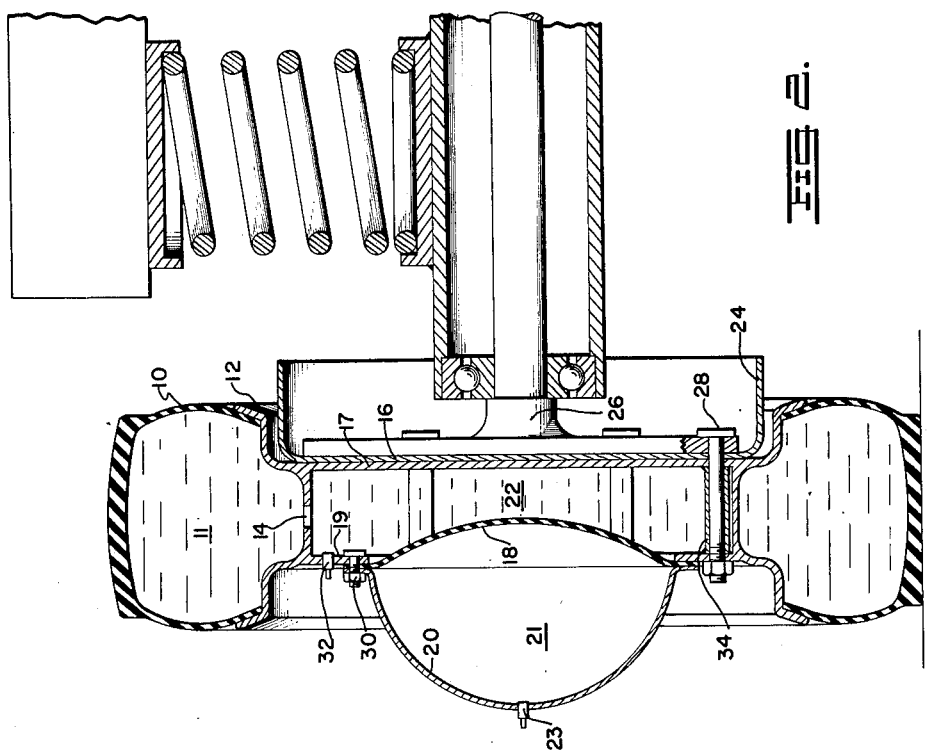
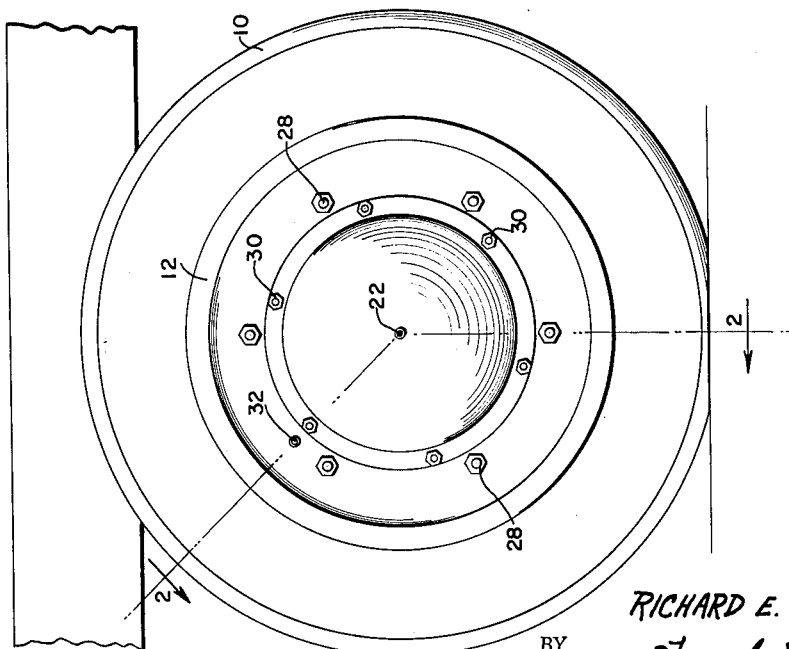
INVENTOR
RICHARD E. RASMUSSEN
BY Frank J. Soucek
ATTORNEY May 8, 1962    R. E. RASMUSSEN    3,033,261
HYDROPNEUMATIC TIRE
Filed June 8, 1960    2 Sheets-Sheet 2
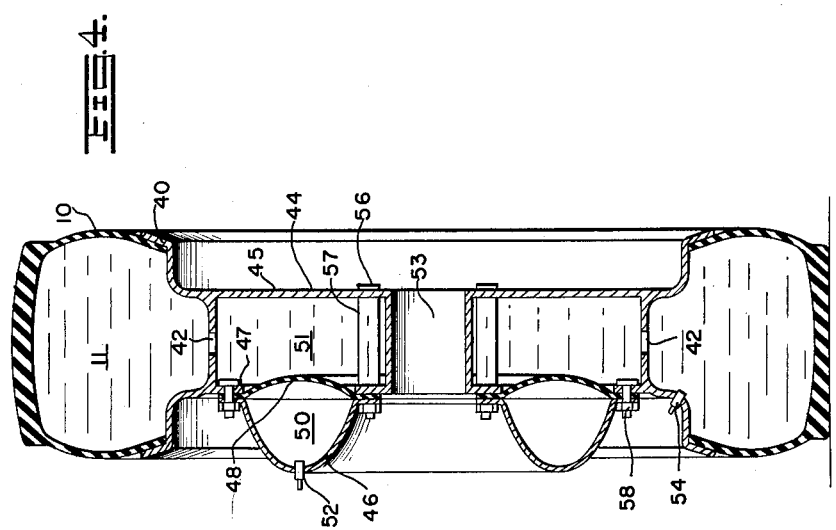
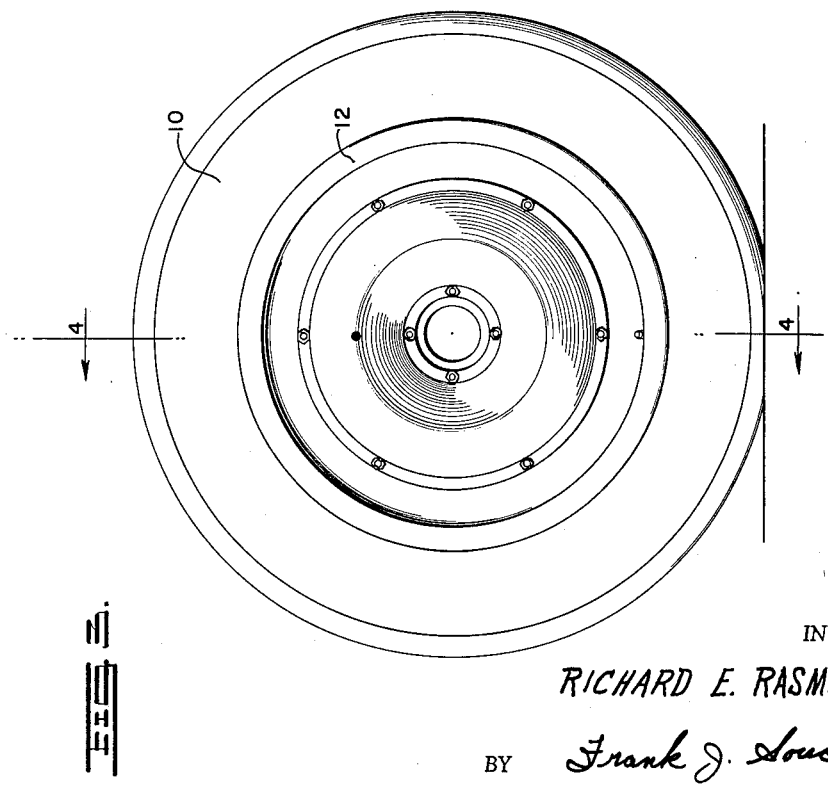
INVENTOR
RICHARD E. RASMUSSEN
BY Frank J. Soucek
ATTORNEY

United States Patent Office 3,033,261
Patented May 8, 1962

3,033,261
HYDROPNEUMATIC TIRE
Richard E. Rasmussen, Milford, Mich., assignor to General Motors Corporation, Detroit, Mich., a corporation of Delaware
Filed June 8, 1960, Ser. No. 34,655
1 Claim. (Cl. 152—10)

This invention relates to vehicle wheel and tire assemblies and more particularly to wheel and tire assemblies containing a plurality of fluids to afford advantageous dampening and stiffening characteristics herein described.

Present automobile tire assemblies produce undesirable vibrations that are transmitted to the vehicle body and vehicle passengers. These vibrations are transmitted to the passenger compartments for the reason that conventional air-filled tires possess little or no dampening characteristics. In addition, it is known that the side walls of presently used tires tend to flex and reduce vehicle cornering ability.

Accordingly, among the objects of this invention is the provision of a multi-fluid filled tire and wheel assembly which dampens road vibrations prior to transmission to the passenger compartments, and at the same time increases tire side wall rigidity for improved vehicle cornering attributes.

A further object of this invention is to maintain oil pressure within a tire and wheel assembly by means of an air or fluid chamber so as to provide such an assembly with an action similar to that of an hydraulic accumulator.

Other objects and advantages of this invention will hereinafter become more fully apparent from the following description of the annexed drawings, which illustrate a preferred embodiment, and wherein:

FIGURE 1 is a plan view of a tire and wheel assembly of the present invention mounted on a vehicle.

FIGURE 2 is a section of the device taken on line 2—2 of FIGURE 1.

FIGURE 3 is a plan view illustrating a tire and wheel assembly of the present invention capable of being mounted on the steerable axle of a vehicle.

FIGURE 4 is a section of the tire and wheel assembly taken on line 4—4 of FIGURE 3.

Referring now to FIGURES 1 and 2, an inflatable tire 10, forming a toroidal fluid receiving chamber 11, is mounted on a conventional rim 12. The rim 12 contains either a single orifice or a plurality of orifices 14 and is integral with a hollow hub or body assembly 16 which includes axially spaced walls 17 and 19. This hollow hub assembly contains a resilient diaphragm member 18 secured within a convex portion 20 to divide the hub assembly into fluid receiving compartments 21 and 22. A filler valve 23 is provided in the convex member 20 to maintain a fluid supply within chamber 21.

A brake drum 24 and an axle hub 26 are mounted on the hub 16 by means of a plurality of bolts 28. The aforementioned convex hub portion 20 is secured to hub 16 by a plurality of circumferentially disposed bolts 30. A filler valve 32 is provided in the hub 16 so that a proper fluid supply may be maintained in chambers 11 and 22. Bushings 34 are welded within cavity 22 to provide a sealed channel which receives the mounting bolts 28.

A modification of the subject invention is illustrated in FIGURES 3 and 4. A conventional tire 10 forming a fluid receiving chamber 11 is mounted upon a conventional rim portion 40 having any number of orifices 42 provided therein. A hollow hub portion 44, including axially spaced walls 45 and 47, receives a semi-annular housing member 46 so that an annular resilient member 48 divides the hollow hub 44 into compartments 50 and 51. Filler valves 52 and 54 are provided in the semi-annular cap member 46 and the conventional rim member 44, respectively. A recess 53 is centrally located within the hub member 44 to receive a steerable vehicle axle. A plurality of bolts 56 are fitted through sealed bushings 57 to secure the assembly upon a steerable axle. These bolts can also be used to fasten cap member 46 and resilient member 48 to the hub 44. Bolts 58 are provided to secure the outer periphery of semi-annular cap member 46 to hub 44.

The subject invention is most effective when the cavities 22 and 51 of FIGURES 2 and 4, respectively, are filled with a fluid and the chambers 21 and 50 are supplied with a desired amount of air. Deformation of the tire 10 then creates a predetermined pumping action between chamber 11 and chambers 22 and 51 through orifices 14 and 42 against diaphragms 18 and 48. This predetermined pumping action can be acquired by calculating or designing the orifice area such that the diaphragms 18 and 48 completely cushion and dampen applied shock and vibration loads prior to transmittal to the vehicle body.

The liquid and fluid pressure present in this tire and wheel assembly also permits lower tire profiles and provides greater lateral side wall stiffness. The greater tire side wall stiffness is created because the air providing the necessary spring action in the assembly is enclosed within the wheel rather than in the tire chamber in conformance with presently used assemblies.

It should be understood that the foregoing disclosure relates to only two preferred embodiments of the invention and that it is intended to cover all changes and modifications of the examples of the invention herein chosen for the purposes of the disclosure, which do not constitute departures from the spirit and scope of this invention.

What I claim is:

A vehicle tire and wheel assembly comprising a wheel member having a conventional tire receiving rim and a hollow web portion, an inflatable tire mounted on said conventional rim, said hollow web portion being defined by a pair of axially spaced walls, a convex shaped cap member, a resilient diaphragm member, means for securing said cap member and said diaphragm to said hollow web portion, said diaphragm defining separate chambers within said hollow web portion and said convex cap member, said inflatable tire and said conventional tire receiving rim forming a toroidal chamber, and an orifice having a specific design area in said conventional rim to transmit fluid pressure against said diaphragm during tire deflections thereby eliminating shock to a vehicle.

References Cited in the file of this patent
UNITED STATES PATENTS

| 2,024,040 | Hollingsworth | Dec. 10, 1935 |
| 2,461,257 | Brandon | Feb. 8, 1949 |
| 2,743,139 | Mowat | Apr. 24, 1956 |

FOREIGN PATENTS

| 910,989 | Germany | May 10, 1954 |